(12) United States Patent
de Silva et al.

(10) Patent No.: US 8,606,612 B2
(45) Date of Patent: Dec. 10, 2013

(54) METHOD AND APPARATUS FOR IMPROVING EFFICIENCY IN EVENT INFORMATION EXCHANGE AMONG PARTIES OF EVENT

(75) Inventors: Andrew de Silva, Torrance, CA (US); Jose Mazas, Torrance, CA (US); Alex Panganiban, Torrance, CA (US); Jianning Zhuang, Torrance, CA (US)

(73) Assignee: Alpine Electronics, Inc, Tokyo (JP)

( * ) Notice: Subject to any disclaimer, the term of this patent is extended or adjusted under 35 U.S.C. 154(b) by 797 days.

(21) Appl. No.: 12/316,170

(22) Filed: Dec. 10, 2008

(65) Prior Publication Data

US 2010/0145764 A1 Jun. 10, 2010

(51) Int. Cl.
*G06Q 10/00* (2012.01)
(52) U.S. Cl.
USPC ....... 705/7.14; 705/7.13; 705/7.18; 705/7.19; 705/7.21
(58) Field of Classification Search
USPC ............... 705/7.13, 7.14, 7.18, 7.19, 7.21
See application file for complete search history.

(56) References Cited

U.S. PATENT DOCUMENTS

| | | | |
|---|---|---|---|
| 6,493,742 B1* | 12/2002 | Holland et al. | 709/200 |
| 6,687,733 B2 | 2/2004 | Manukyan | |
| 8,510,145 B2* | 8/2013 | Rowland | 705/7.13 |
| 2002/0128934 A1* | 9/2002 | Shaer | 705/27 |
| 2004/0098275 A1* | 5/2004 | Hubert | 705/1 |
| 2004/0103034 A1* | 5/2004 | Reade et al. | 705/16 |
| 2006/0271381 A1* | 11/2006 | Pui | 705/1 |
| 2006/0271394 A1* | 11/2006 | Kelly | 705/1 |
| 2008/0228544 A1* | 9/2008 | Woosley et al. | 705/8 |
| 2009/0132387 A1* | 5/2009 | Majdoub | 705/27 |
| 2009/0157486 A1* | 6/2009 | Gross | 705/10 |
| 2011/0106429 A1* | 5/2011 | Poppen et al. | 701/201 |

FOREIGN PATENT DOCUMENTS

JP 2006-15938 1/2006

OTHER PUBLICATIONS

Script VO de l'épisode 2.19—How I met your mother, hypnoweb.net, retrieved Jun. 29, 2011, p. 1-7 [hereinafter HIMYM script].*
Bachelor Party (How I Met Your Mother), Wikipedia.com, retrieved Jun. 29, 2011, p. 1-3.*
Robin's Bridal Shower Gift (HIMYM)—Parts 1-2, Bro's before Ho's, Sep. 24, 2008, 12:26pm, p. 1-18, http://shanahben.multiply.com/?&preview=&item_id=105&album=265&photo=& page_start=220.*
How to Trade Gift Certificates, eHow.com, retrieved from web.archive.org, Dec. 22, 2007, p. 1-2.*
Potluck for everyone?, etiquettehell.com, Mar. 12, 2008, retrieved Jun. 29, 2011, p. 1-2.*

* cited by examiner

*Primary Examiner* — Justin M Pats
(74) *Attorney, Agent, or Firm* — Muramatsu & Associates

(57) ABSTRACT

A method and apparatus for improving efficiency and accuracy in event information exchange among users of navigation systems or other devices through wireless communication. The method includes the steps of: receiving information indicating an upcoming event, an event location, and participants thereof input by a user; checking a database storing data regarding types of event in response to the information input by the user to determine a type of the event; retrieving information regarding items required for the type of event determined and generating a template including a list of what items to bring by the participants of the event; and sending the template to the participants of the event through wireless communication.

18 Claims, 11 Drawing Sheets

Fig. 1A
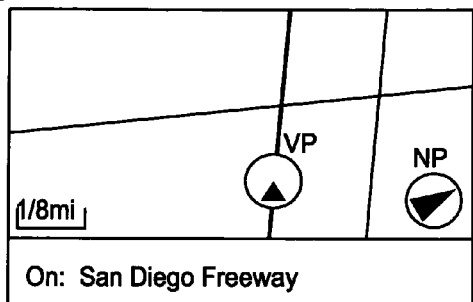
Fig. 1B
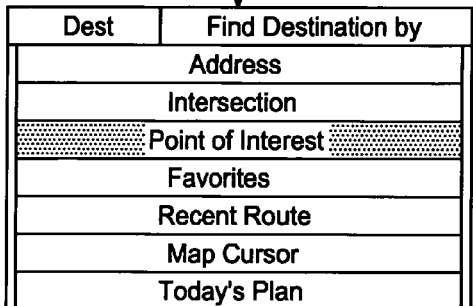
Fig. 1C
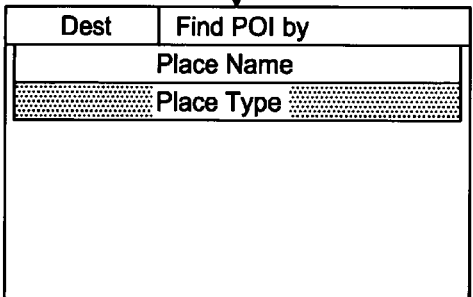
Fig. 1D
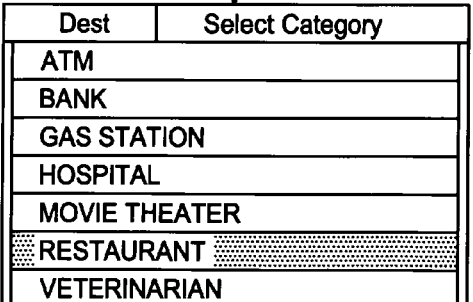
Fig. 1E
| Dest | Select Name |
|---|---|
| Genkai 15435 Jeffrey Rd. Irvine, CA (949) 786-3420 | |
| Pizza Hut | |
| Genkai | |
| Hard Rock Cafe | |
| Sushi Boy | |
Fig. 1F
| Confirm Route | |
|---|---|
| Genkai 15435 Jeffrey Rd. Irvine, CA (949) 786-3420 | |
| By Quickest Route Method | |
| OK to Proceed | |
| Options | |
Fig. 1G
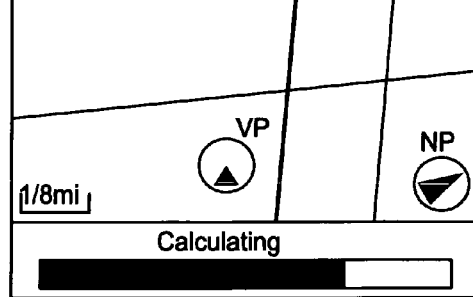
Fig. 1H
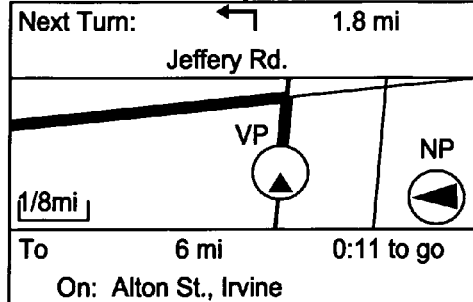

Fig. 2

```
Fishing
Irvine Lake
4621 Santiago Canyon Rd.
Silverado Ca. 92676
6:00 PM  June 8, 2009
  To bring:
  Fishing rod
  Pliers
  Fishing knots
  Fishing license
```

Fig. 3

```
Barbecue
Dana Point Harbor
34661 Puerto Pl
Dana Point, Ca 92629
6:00 PM  June 12, 2009
  To bring:                    ┌37
  4 slabs of Baby Back Ribs   │Where to buy│

[Other Participants]  [Note]  [More]
         31              33      35
```

Fig. 4A

| | |
|---:|:---|
| Activity name | BBQ at Dana Point ▼ |
| Group name | Irvine piano teacher's association ▼ |
| Place | Dana Point Harbor ▼ |
| Send to | All member ▼ |
| Sent by | Administrator ▼ |
| Memo | We are having annual barbecue get-together at beautiful Dana Point Harbor!<br>November 11, 2008<br>6:00 PM<br><br>What to Bring:<br>(1) 4 slabs of Baby Back Ribs<br>(2) a half dozen of canned beer<br><br>Hope to see you all! |

Fig. 4B

BBQ at Dana Point Harbor
Nov. 11, 2008, 6:00 PM

What to Bring:

(1) 4 slabs of Baby Back Ribs
(2) a half dozen of canned beer

Fig. 5

| | |
|---:|:---|
| Activity name | Irvine lake fishing trip ▼ |
| Group name | Irvine fishing club ▼ |
| Activity Type | fishing ▼ |
| Date | 06/08/2009 ▼ |
| Time | 6:00 PM ▼ |
| Send to | All member ▼ |
| Sent by | Administrator ▼ |
| http:// | www.irvinelake.net/ ▼ |
| Street | 4621 Santiago Canyon Rd. ▼ |
| City | Silverado     CA ▼ |
| Zip | 92676 |
| List | fishing rod ▼ |
| | pliers ▼ |
| | fishing knots ▼ |
| | fishing knots ▼ |
| How often? | One time ▼ |
| Memo | Hope to see you all! |

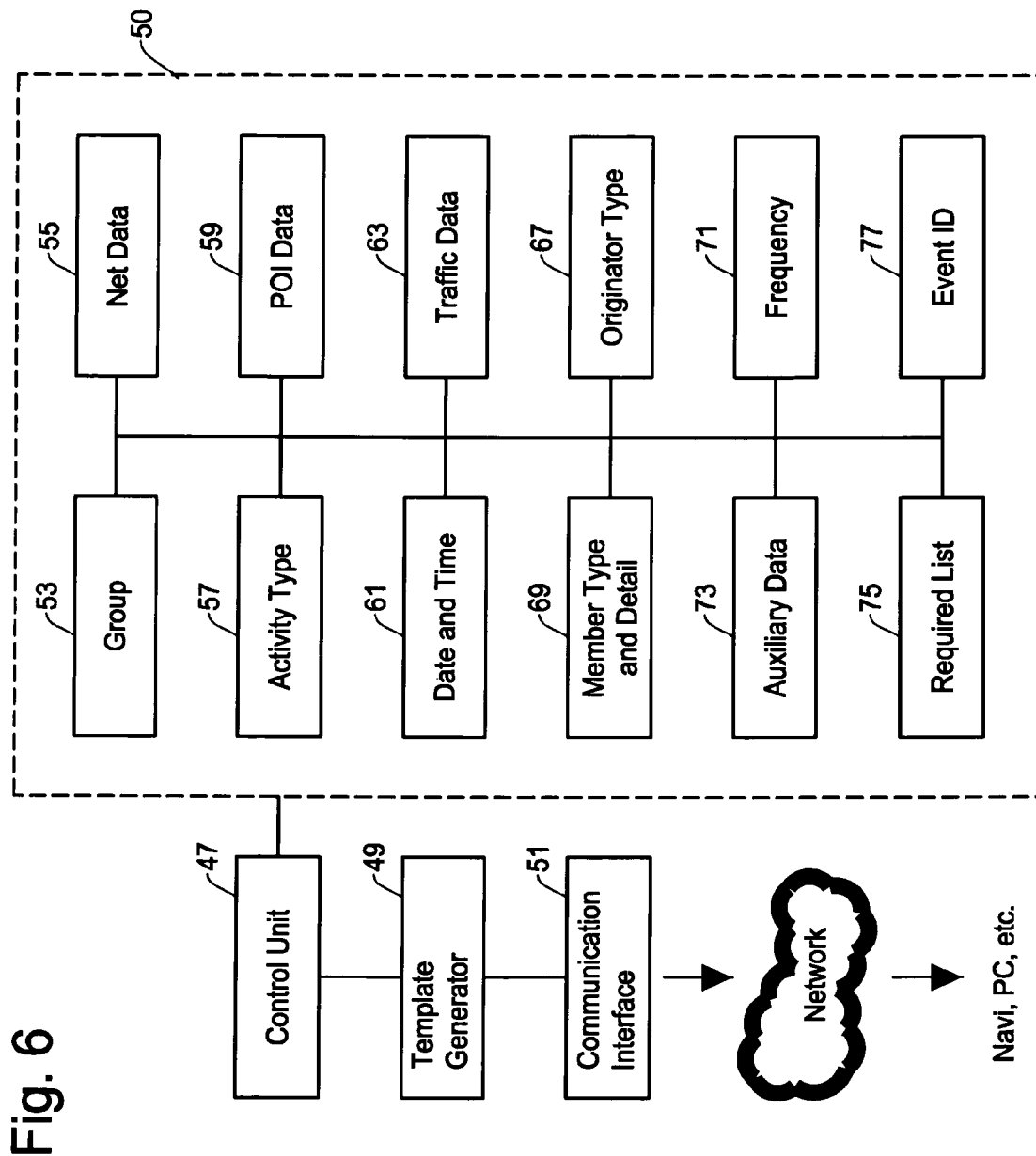

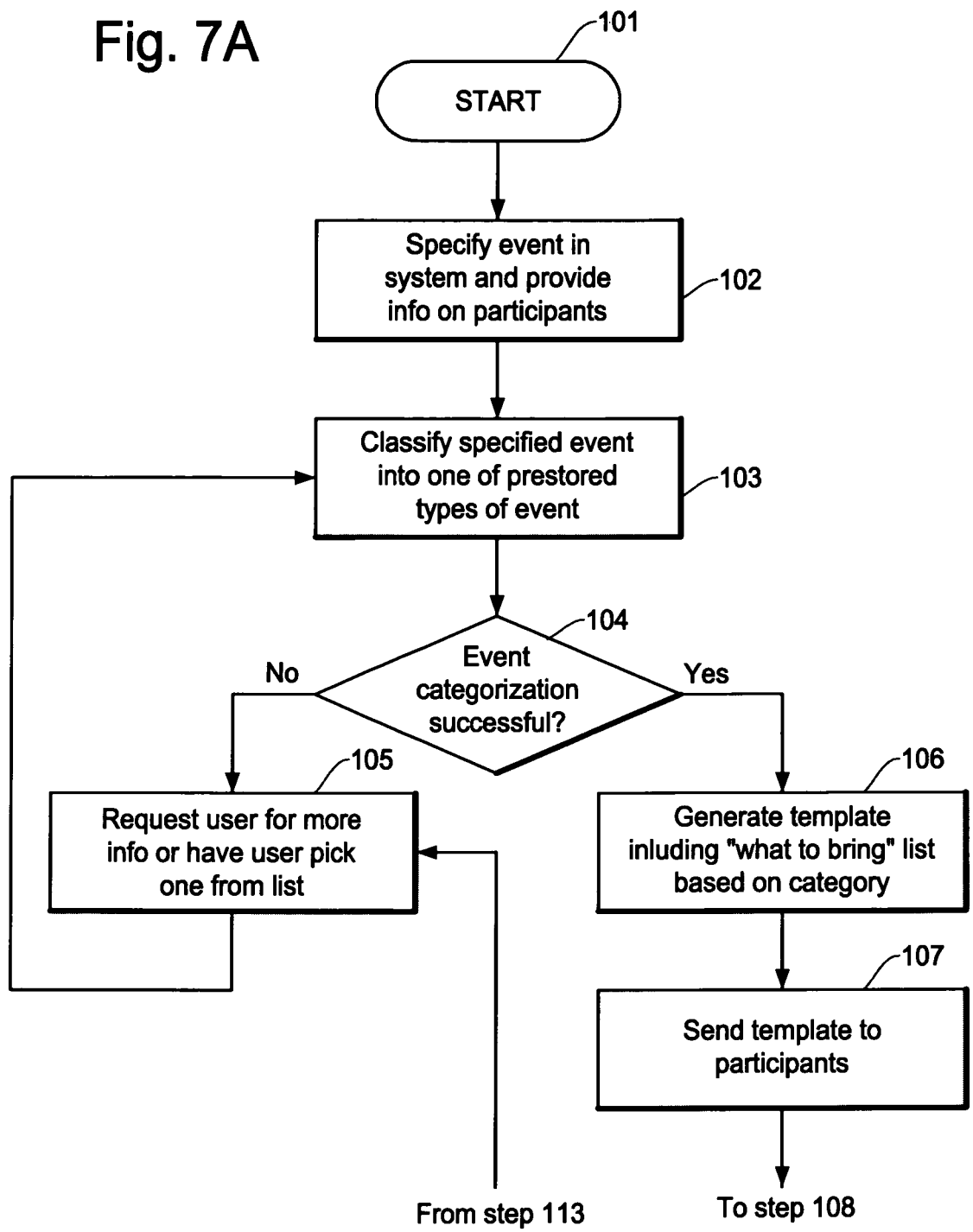

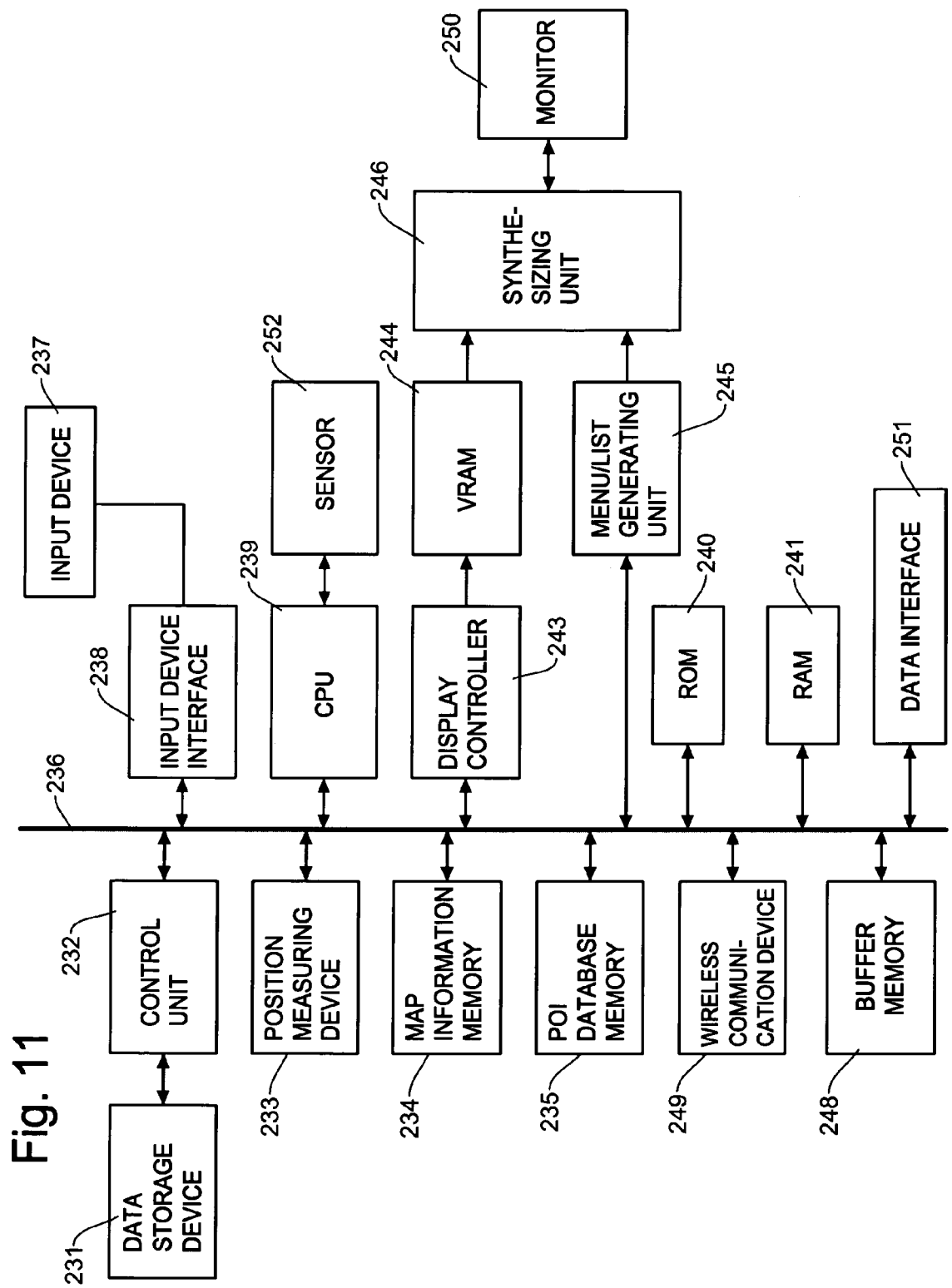

METHOD AND APPARATUS FOR IMPROVING EFFICIENCY IN EVENT INFORMATION EXCHANGE AMONG PARTIES OF EVENT

FIELD OF THE INVENTION

This invention relates generally to a method and apparatus for improving usability of navigation system, and more particularly, to a method and apparatus for improving efficiency and accuracy in event information exchange among users of navigation systems or other devices through wireless communication by setting an event, providing detailed information on the event, suggesting items to bring, and allocating the items to participants.

BACKGROUND OF THE INVENTION

A navigation system (global positioning system or GPS) performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc. Typically, the navigation system displays a map image on a monitor screen while superimposing thereon a mark representing the current location of the user.

FIGS. 1A-1H show an example of overall procedure and screen display involved in the navigation system for route guidance to a destination. FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen.

When a user selects to set a destination, the navigation system displays a "Find Destination by" screen as shown in FIG. 1B for specifying an input method for selecting the destination. When selecting, the "Point of Interest" method in FIG. 1B, the navigation system displays selection methods of point of interest (POI) either by "Place Name" or "Place Type" in FIG. 1C. If the "Place Type" is selected, the navigation system lists categories of POIs as shown in FIG. 1D.

FIG. 1E shows a screen when the user has selected a "Restaurant" category in FIG. 1D, which includes a list of names of POI type "Restaurant" typically sorted by distance from the current position. The user selects a desired destination, as shown in FIG. 1F and presses an "OK to Proceed" button for the navigation system to calculate an appropriate route to the destination. FIG. 1G shows an example of screen when the navigation system calculates and determines the route to the destination. After determining the route, the navigation system starts the route guidance to the destination as shown in FIG. 1H.

In the operation of the navigation system noted above, typically, the navigation system is able to calculate a route from a starting point to a destination and guide the user to the destination. In addition to such navigation function, the recent navigation system has other functionality, such as a communication capability, an audio player capability, an internet browser capability, etc. For example, with user of the wireless communication capability, the navigation system can receive and display the traffic condition with respect to the route to the destination.

In other words, the recent navigation system is able to provide not only the navigation function but also able to serve as a communication device, a man-machine interface, etc. Therefore, it is desirable to extend usability and functionality of the navigation system by making use of the ability of the navigation system. It is desirable to increase application of the navigation systems by exchanging information among a plurality of users through the wireless communicate function of the navigation system.

SUMMARY OF THE INVENTION

It is, therefore, an object of the present invention to provide a method and apparatus for a navigation system or other devices which is capable of exchanging information regarding an event among participants through wireless communication among the participants.

It is another object of the present invention to provide a method and apparatus for a navigation system or other devices which is capable of creating a template that fit to an intended event and exchanging the template among participants of the event to assign items to bring and roles to play to the participants.

It is a further object of the present invention to provide a method and apparatus for establishing a wireless communication network among navigation systems, personal computers, wireless phones, etc. to exchange information on an event among participants of the event.

One aspect of the present invention is a method for exchanging information on upcoming event among participants of the event. The method includes the steps of: receiving information input by a user indicating an upcoming event, an event location, and participants thereof; checking a database storing data regarding types of event in response to the information input by the user to determine a type of the event; retrieving information regarding items required for the determined type of event and generating a template including a list of items to bring by the participants of the event; and sending the template to the participants of the event through wireless communication.

The method of the present invention further includes a step of allowing the participants to voluntarily assign as to who should bring what items in response to the template received or automatically allocating the items to bring to the participants based on predetermined factors and notifying the results of allocation to all of the participants. The method of the present invention further includes a step of allowing the participants to trade among the participants as to who should bring what items to the event and notifying the results of trade to all of the participants.

The method of the present invention further includes a step of collecting information on behavioral aspects of the participants including as to who is in good combination with who, interests of each participants, habits of participants, comments and evaluation by participants, at the end of the event for future reference. Further, the step of checking the database storing data regarding types of event includes a step of requesting the user to provide additional information to determine the type of event.

The method of the present invention further includes a step of providing recommendation to the participants as to where to procure the assigned items. This step further includes a step of searching a database of points of interest (POI) and retrieving information on places where the assigned items are available as candidate locations for further evaluation, and a step of determining a recommended location to procure the item based on overall costs which include a price of the item, proximity to a home address of the participant, and proximity to a guidance route that leads to the event location.

In the present invention, the template has a small card shape when displayed on a screen which mainly lists the items to bring or has a large card shape when displayed on the screen which is substantially the same as an input screen of a navigation system, personal computer, etc. for entering the initial information on the upcoming event by the user. Further, in the present invention, the participants of the event communicate with one another through the wireless communication by commonly accessing a server for exchanging information or the participants of the event directly communicate with one another through the wireless communication without accessing the server.

Another aspect of the present invention is an apparatus for a navigation system or other device to exchange information regarding an event among participants through wireless communication by implementing the various steps of the method described above. The apparatus of the present invention enables the participants of the event to suggest or announce an event such as a party or a sports activity, and send information on the event such as a template indicating items to bring by the participants, roles of participants, etc. The method and apparatus significantly improves efficiency and accuracy in event information exchange among the participants.

According to the present invention, the navigation system or other devices allow the participants of event to suggest or announce an upcoming event such as a party or a sports activity, and send information on the event such as a template indicating the items to bring by the participants, roles of the participants, etc. The present invention can be advantageously applied in combination with navigation systems for a upcoming event at a given destination since the navigation system can suggest where to purchase the items, guide the participants to the event location, etc. Moreover, the present invention allows the participants to add, remove, or trade the items to bring for the event or exchange information related to the event, etc. among the participants. Thus, the method and apparatus significantly improves efficiency and accuracy in the event information exchange among users of navigation systems or other devices.

BRIEF DESCRIPTION OF THE DRAWINGS

FIGS. 1A-1H are schematic diagrams showing an example of operational process and screen display involved in the navigation system for selecting a destination and travelling to the destination under the route guidance.

FIG. 2 is a schematic diagram showing a display example of navigation system or other device implementing the present invention for event information exchange applied to the case of a fishing trip including a list of items to bring by participants.

FIG. 3 is a schematic diagram showing another display example of navigation system or other device implementing the present invention for event information exchange applied to the case of a barbecue party including a list of items to bring by participants.

FIG. 4A is a schematic diagram showing a display example of the present invention through which a user enters information for setting an event through a navigation system, a personal computer, or other device, and FIG. 4B is a schematic diagram showing an example of template sent to participants of event indicating what items to bring.

FIG. 5 is a schematic diagram showing a display example of the present invention similar to that in FIG. 4A where the display includes more detailed and different types of input fields.

FIG. 6 is a schematic functional block diagram showing a basic structure of central processing system having a control unit and a database with various data storage for the enhanced productivity and efficient exchange of event information in the present invention.

FIGS. 7A and 7B are flow charts showing the process steps of the present invention for the enhanced productivity and efficient exchange of event information where FIG. 7A shows a first half of the procedure and FIG. 7B shows a second half of the procedure.

FIG. 11 is a functional block diagram of a vehicle navigation system implementing the method of the present invention for exchanging the event information among participants through the wireless communication.

DETAILED DESCRIPTION OF THE PREFERRED EMBODIMENT

Figure 7B:
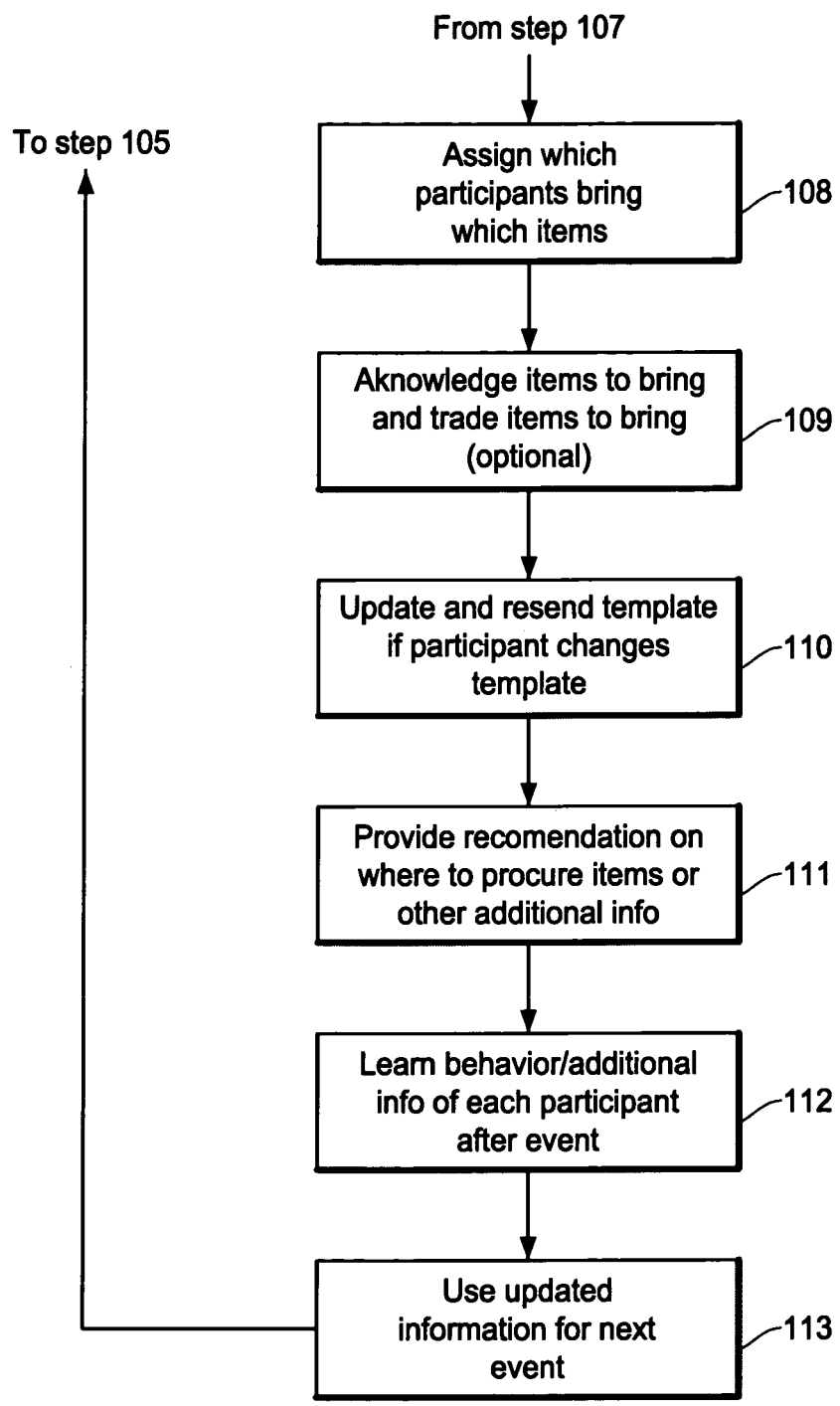

The method and apparatus for improving efficiency and accuracy in event information exchange among users of navigation systems or other devices in the preset invention is described in detail with reference to the accompanying drawings. The present invention allows users (members or participants of event) to suggest or announce an event such as a party or a sports activity, and send information on the event such as a template indicating items to bring by participants, roles of participants, etc. The present invention can be advantageously used in combination with navigation systems for an upcoming event at a given destination since the navigation system can suggest where to purchase or acquire the items, guide the participants the place to purchase and to the event location, etc. Moreover, the present invention allows the participants to add, remove, or exchange the items to bring for the event and exchange information related to the event, etc. among the participants.

FIG. 2 is a schematic diagram showing a display example of navigation system or other device implementing the present invention for event information exchange applied to the case of a fishing trip including a list of items to bring by participants. On this display, an event name is shown at the top and the location or place name for the event and its address are presented. Moreover, on the screen, the date and time of the event and items to bring by the participants for the event are listed as well.

More specifically, in this example, the display of navigation system or other device shows that this particular event is fishing at Irvine Lake. In addition to the address, time and date, the "what to bring" list shows a list of items such as a fishing rod, fishing knots, pliers, etc., to remind the participants to bring those items to the fishing activity held in Irvine Lake. In the case where the list of items exceeds the current screen size, up/down scroll keys at the right side of the display allows the user to see the other items by scrolling the screen.

FIG. 3 is a schematic diagram showing another display example of navigation system or other device implementing the present invention for event information exchange applied to the case of a barbecue party including a list of items to bring by participants. The barbecue party will be held at Dana Point Harbor as displayed on the screen on which the address and start time of the party are also shown. In this example, in addition to the example of FIG. 2, various selection keys are provided to check the additional or supplemental information regarding this event.

For example, an "Other Participant" key 31 is provided so that the screen will show the information on all of the participants of this event when this key is activated. Moreover, next to the item to bring statement of "4 slabs of baby back ribs", a "Where to buy" key 37 is provided so that the system will suggest a location or locations to obtain the listed items when this key is activated. A "Note" key 33 will lead to display a specific feature or something to take note regarding the event, and a "More" key 35 will lead to display more detailed information regarding the event.

Although FIGS. 2 and 3 are directed to only two different events, the present invention is applicable to many other event categories (types). Examples of the event include roller hockey, ice hockey, soccer, gymnastics, baseball, softball, T-ball, tennis, football, ballet and dance, basketball, track & field, swimming, skiing and snow boarding, martial arts, surfing, skating, skate boarding, music lessons, hiking, field trip, etc. Event information can be entered and exchanged through personal computers, navigation systems, cellular phones, or other terminal devices with wireless communication capability.

FIG. 4A is a schematic diagram showing a display example of the present invention through which a user enters information for setting an event and associated information to be transmitted to other users. This display example is basically an input screen but can be a template for sending this form as a whole or can create a separate template as shown in FIG. 4B based on the data supplied to the input screen of FIG. 4A. The input screen is used for filling the information through a navigation system, a personal computer or other terminal device where such device preferably has an internet browser capability and exchange the template among the users.

In the example of FIG. 4A, an activity (event) name is "BBQ at Dana Point", a group name (participants) is "Irvine piano teacher's association", and date and time is Jun. 12, 2009 at 6:00 pm. A memo area on the input screen contains announcement of event and casual notes relating to the event. Based on the type of event specified by the user, the navigation system (or central processing system of FIG. 6) checks the database and determines a list of items to bring by the participants as also shown in the memo area.

Namely, the central processing system reads the content of the memo, finds a relevant category of the event, and suggests what to bring based on the relevant category. In this case, the word "barbecue" fits one of predefined keywords, and the central processing system retrieves list of related information from the predefined database (ex. database 50 in FIG. 6). For example, the barbecue category has a predefined list of "what to bring" in the database which is retrieved by the central processing system and displayed on the display screen of the user.

Figure 10:
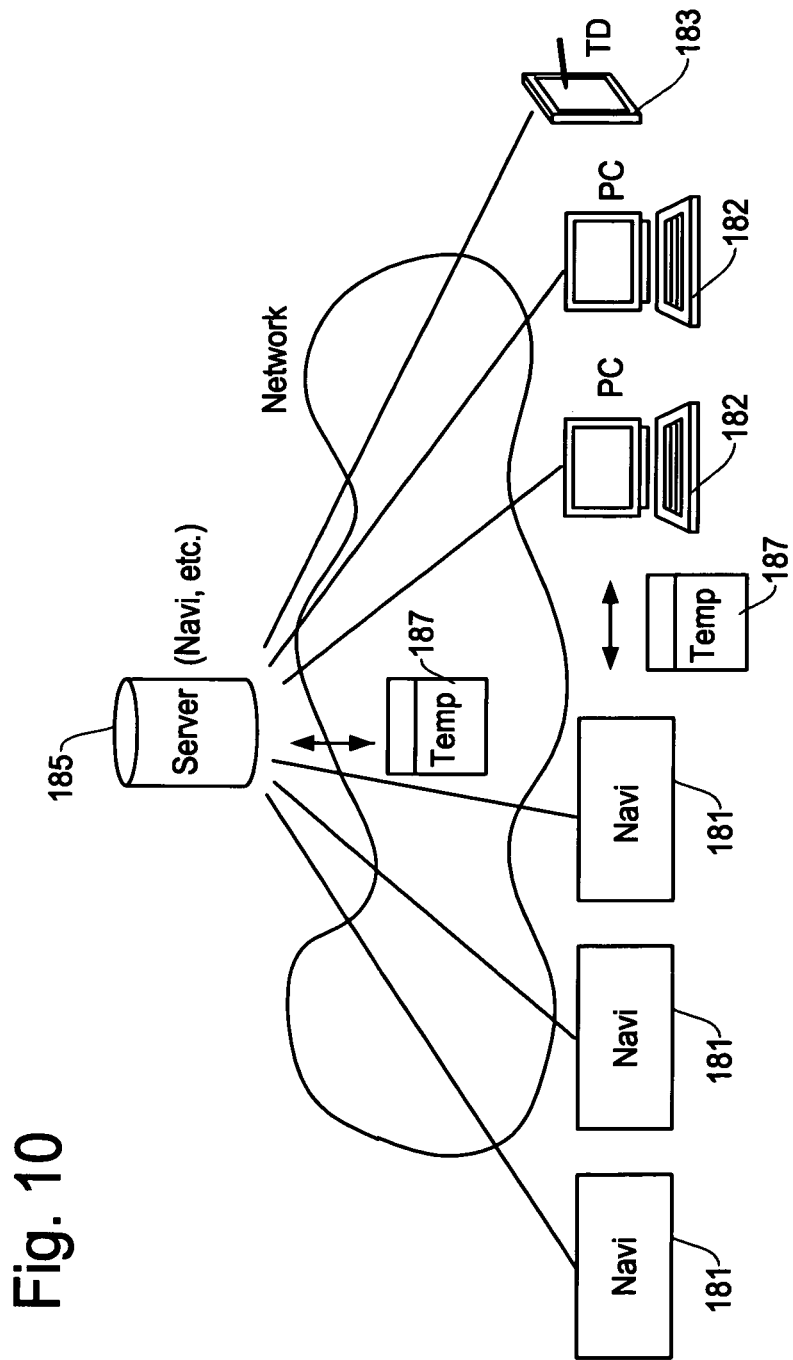
FIG. 10 is a schematic diagram showing an overall structure of network connecting participants devices, such as navigation systems, computer terminals, mobile devices, and a server in accordance with the present invention.

FIG. 4B is a schematic diagram showing an example of template sent to participants of event indicating what items to bring. Unlike the example of FIG. 4A, in FIG. 4B, the template mainly showing the "what items to bring" list is separately created based on the information described through the input screen of FIG. 4A. The template will be sent to the participants from the server (central processing system) or directly among the participants (FIG. 10).

FIG. 5 is a schematic diagram showing another display example (input screen, template) of the present invention through which a user enters information for setting an event and associated information to be transmitted to other users. This example of input screen includes a list of input fields or menus where a user inputs information through a web browser of a personal computer, navigation system, or other terminal devices. This example has more input fields for different types of information on the screen compared to the example of FIG. 4A described above. It is also possible that, after filling the data, the input screen of FIG. 5 can be sent to other members (participants) as a template directly or through the internet.

This configuration of input screen is advantageous to make minute adjustments and write detailed information as well as to specifically set a category (activity type) of an event. This input screen (template) may also be advantageously used when the central processing system fails to determine the category of the event in the setting described with reference to FIG. 4A so that further information can be provided by the user. Thus, in the example in FIG. 5, such fields as "Activity name", "Group name", "Activity type", "Date", and "Time" are separately provided each being filled by the user.

The input screen (template) of FIG. 5 further has such fields as "Send to", "Sent by", "http://", address (Street, Zip, etc.), list of items to bring, frequency ("How often?"), and "Memo". The information that has been input previously may be retrieved by a pull down menu indicated by an arrow key at the right end of each input field. The input screens of FIGS. 4A and 5 are merely examples, and many other forms of input screen to implement the present invention can be possible. For example, the event information may be input by a voice recognition system.

If necessary, the central processing system (FIG. 6) can retrieve information on the feature of the location (ex. "Irvine Lake") through the internet. The web address (http) and destination name shown in FIG. 5 may be used to search and retrieve such information where the web address may be entered manually or pre-stored in the POI database. The information from the web site is read and interpreted by a web interpreter to retrieve necessary information.

As noted above with reference to FIGS. 4A-4B and 5, in the present invention, it is preferable to use the template to show the relevant information and exchange among the participants. Various categories of templates are pre-established in the central processing system (server) or can be newly created by the user. Each category has relevant information such as a "what to bring" list that transmits the items that are required by particular participants for the selected activity (event).

As indicated in the examples of FIGS. 4A and 5, in the input screens (templates), notes describing the event, an event location, date and time are linked to the category of event. In addition to the information provided in the template, the user may enter additional information including items to bring. For example, a coach may instruct the member to bring extra paddles for canoe.

FIG. 6 is a schematic functional block diagram showing a basic structure of central processing system having a control unit and a database with various data storage for the enhanced productivity and efficient exchange of event information with use of the navigation systems or other devices of the present invention. The central processing system performs the steps of integrating a plurality of participants (users), assigning a role of participants ("what to bring", "where to get them", etc), sending and receiving information among the participants, etc.

In the preferred example, the central processing system is a web server (FIG. 10) so that the members can access to the server. Alternatively, the central processing system of FIG. 6 can be a microprocessor and data storage in a navigation system, a personal computer PC or other data terminal DT. In the example of FIG. 6, the central processing system includes a control unit 47, a template generator 49, a communication interface 51 and a database 50 where the template generator 49 and communication interface 51 can be a part of the control unit 47. The communication interface 51 sends and receives the template among the navigation systems or other devices of the users directly or indirectly via a network such as internet.

In the example of FIG. 6, the database 50 is configured by various types of data storage to create a template such as shown in FIGS. 4A-4B and 5 by the template generator 49. The group 53 is the data that defines a group to which a particular event applies. An example of a group includes a boy scout, a college club, a social club such as Orange county guitar circle or Atlanta fly fishing club. The group may be an ongoing group or a one time group.

The activity type 57 defines a type of activity (event type) such as fishing, hiking, field trip, baseball game, etc. The date and time 61 defines the date and time on which a particular event is taken place. The member type and detail 69 defines a type or category of membership and its detail, such as fishing club members where some members are advanced anglers that require different types of fishing equipment. For college club members, some are on a higher hierarchy with specific responsibility. The member type and detail 69 further stores data regarding detailed information on a member, for example, information regarding a strong point of a member, such as being a good baker, is stored and can be used to provide better suggestion for assigning an item to bring or role in the event.

The originator type 67 defines the type and/or identity of a person or an entity that has originally input the information regarding an event. The frequency 71 defines a frequency of a particular event where some events may recur weekly, monthly, or with non-regular interval, and others may be a one-time event. The traffic data 63 indicates traffic information relevant to the location of the event such as map data as well as traffic condition data.

The net data 55 shows the information related to a particular event that is accumulated through connection with networks such as internet. For example, for the case of "fishing" as an event, information on fishing tools, suggestions by a fishing champion, how to cook a particular type of fish, etc. can be accumulated. The POI data 59 indicates POI information related to a particular event which may include not only the name and address but also the telephone number, web address and other relevant information of the location of the event.

The required list 75 shows a list of items, such as things to bring by the participants, related to a particular event. In the example of fishing activity, the required list 75 would include fishing rod, pliers, fishing knots, sun glasses, skin cream, etc. The auxiliary data 73 is other information related to a particular event which may include a memo related to a particular event.

The event ID 77 is used to identify a particular type of event and includes a list of identification and/or event names. As noted above, the various types of data or data storage described above in the database 50 are used to generate the template by the template generator 49. The template includes the event name, event location, date and time, what to bring, etc. that are retrieved from the various data noted above and assembled in the manner shown in FIGS. 4A-4B and 5. As noted above, the communication interface 51 sends and receives the template among the navigation systems, personal computers, or other devices of the users directly or via the network (server).

An example of fishing trip by a fishing club is described as applied to the functional components of FIG. 6 described above and the template of FIG. 5. It is assumed that substantially all the information necessary for the event is input by the user through the input screen of FIG. 4A or 5 and stored in the database 50. An example of operation for creating the template (same as the input screen) of FIG. 5 is as follows.

The event (activity) name "Irvine lake fishing trip" on the template is retrieved from the event ID 77. Similarly, the group name "Irvine fishing club" on the template is retrieved from the group 53. The activity type "fishing" on the template came from the activity type 57.

Further, the date and time are retrieved from the date and time 61 which indicates "Nov. 11, 2008" and "6:00 PM". The send to "All member" on the template is retrieved from the member type 69 while the sent by "Administrator" is retrieved from the originator type 67 is "club administrator". The how often "one time" in the template is retrieved from the frequency 71 is.

The POI data 59 provides the location name "Irvine lake" as well as the address "4621 Santiago Canyon Rd. Silverado Calif. 92676" on the template. The template shows the home page address of the Irvine lake that is retrieved from the net data 55 to provide the information related to the feature of the event location. The required list 75 provides the list of items to bring by the participants. The template generator 49 shown in FIG. 6 generates the template of FIG. 5 based on those data, and the communication interface 51 sends the template to each participant.

FIGS. 7A and 7B are flow charts showing the operational steps of the present invention for the enhanced productivity and efficient exchange of the event information where FIG. 7A shows a first half of the procedure and FIG. 7B shows a second half of the procedure. The process described by the flow charts is particularly effective for a party gathering or a similar event where a plurality of members partially takes charge of the event. Referring to FIG. 7A, as the procedure starts in the step 101, the user (original poster) specifies an event and information on its participants, etc., through the central processing system (FIG. 6) in the step 102.

As noted above, the user may set the event through a personal computer PC, navigation system, cellar phone, or any other portable devices having an internet accessibility or a wireless communication capability. The event information is stored in a web server so that member's PCs, navigation systems, etc. can reach the web server through the internet. Alternatively, one of the member's devices, such as a navigation system can act as a server and store the event information and send the template such as shown in FIGS. 4A-4B and 5 to the other member's devices through the internet or directly.

In the step 103, the central processing system attempts to automatically classify the event according to a keyword or a key phrase input by the user with use of the activity type 57 of FIG. 6, or user categorization tendencies, or according to an event type specified for the central processing system by the user. In the step 104, the central processing system will determine whether the event categorization has been successful. If the event categorization has not been successful in the step 104, the central processing system will request the user to provide more information on the event.

Thus, the user may manually enter further information on the event or select an entry from a list of entries to specify the event category. This step is repeated until successful categorization is achieved or the specified event is recognized as a new event with respect to the event category data existing in the central processing system. When the categorization has been successful in the step 104, the central processing system generates a template including a "what to bring" list in the step 106 based on the required list 75 (FIG. 6).

Namely, the database 50 of FIG. 6 is accessed and the required list 75 that defines "what to bring" for each category of event is searched and the data of "what to bring" for the specified event will be retrieved. Next, the template that shows the "what to bring" list as shown in FIG. 4B is sent to the member's devices, such as a navigation system, PC, etc. in the step 107. In FIG. 4B, the template has a small card shape when displayed on a screen which mainly lists the list what items to bring. Alternatively, the template that shows all of the information concerning the event such as shown in FIG. 4A or 5, i.e., the overall input screen, can be sent to the members device. Namely, the template of FIGS. 4A and 5 has a large card shape when displayed on the screen which is substantially the same as the input screen of a navigation system, personal computer, etc. for entering the initial information on the upcoming event by the user.

With reference to the flow chart of FIG. 7B, in the step 108, the participants are voluntarily or involuntarily assigned as to who should bring what items in response to the template received. The participants may choose the items by a "first come first served" basis by sending a response to the template, or the central processing system may automatically assign the items to the participants in an "one person by one person" basis based on predetermined factors such as skills of participant, balance of burdens, costs, etc. In the step 109, each of the participants acknowledges that he/she will bring the items that are assigned or what he/she has chosen to bring.

The participants may trade the items to bring with other participants by communicating with them via navigation systems, PC, phones, etc. As acknowledgement or trading are made, such information is updated in the central processing system which is synchronized with the participating devices such as a navigation system, PC, etc. Thus, in the step 110, in the case where the participants make any change to the "what to bring" template after it was already sent out, such update is transmitted to all of the participants notifying them of the change.

In the next step 111, the central processing system provides recommendation or suggestion as to where to purchase or acquire the items to bring. This recommendation may be based on a POI (points of interest) database or internet information retrieved, for example, from the net data storage 55 and POI data storage 59 in FIG. 6. The locations of the recommended store, etc., may be based on whether it is located at an easily accessible location for a participant or on its way to the event location (destination). Moreover, the purchase location may also be searched based on a price comparison web site to find better price. Once the assigned items have been procured, the central processing system shall make a record of it for future reference.

In the step 112, after the event is completed, the central processing system stores information regarding each participants behavior as associated with the event. The central processing system collects information as to who is in good combination with who, interests of each participants, habits of participants, comments and evaluation by participants, etc. based on inputs by the participants, hosts, organizer, etc. Such information stored in the central processing system may be used to provide recommendations for the next event.

For example, the information on member's preference such as which food the member prefers is stored in the central processing system. The information indicating skill/strong points of participated members may also be stored in the processing system. As an example, the information that a particular member is a good baker can be used advantageously in assigning "what to bring" items so that this member is preferentially assigned the task of bringing home-made bread in the future event.

A member that has the best basketball is assigned the task of bringing the basketball in such an event as basketball match. As noted above, this type of information will be input manually by the participants or other persons involved in the event, at the end of the event, for future reference for the same type of event. Other information that can be collected for this purpose includes medical condition of the member, geographic location of the member, profession of the member, etc. After renewing the participants data as noted above, the central processing system will use the new information for the next event of the same type so that appropriate sorting of "what to bring" or "what role to play" can be performed in the step 113.

Figure 8:
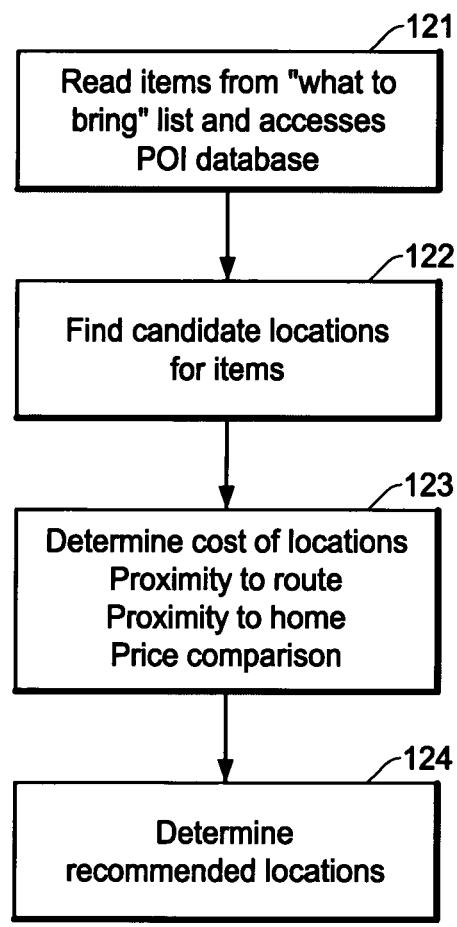
FIG. 8 is a flow chart showing the operational steps of the present invention for suggesting a place, such as a store or supermarket, to obtain items in a "what to bring" list for the participants of the event.

A procedure that describes the step of suggesting a place (ex. store, supermarket) to obtain the item from the "what to bring" list is described in more detail with reference to the flow chart of FIG. 8. In other words, the process of FIG. 8 is a sub-process of the steps 111 of FIG. 7B. In the first step 121, the central processing system will read the "what to bring" items from the required list 75 in the database 50 (FIG. 6) based on the particular event category. Further in the step 121, the central processing system will read the POI database 59 in FIG. 6 to search candidate places to obtain the items.

In the step 122, the central processing system finds the candidate places by checking which location (store) has the items in the "what to bring" list. In the step 123, the determination is made as to which locations can provide a lower overall cost (price, time, distance, etc.) for the items to find better candidate locations. For example, the locations near the home address of the participant are assigned lower costs, i.e., preferable.

Moreover, accessibility of a location (store, supermarket, etc.) from the calculated route to the event destination affects the overall cost. For example, a supermarket that is located 0.2 miles from the calculated route is assigned the cost value of 3 (low) while a supermarket located 3 miles from the route is assigned the cost value of 10 (high). The central processing system may also compare the price among the stores or check a price comparison web site to find the price difference if such information is available.

As a result of this evaluation, depending on the price, proximity to home address, proximity to guidance route, the overall cost associated with the location may be changed. Finally, with all the costs taken into consideration, the central processing system will determine the recommended locations in the step 124. The recommended locations will be displayed, for example, when the user presses the "Where to buy" button 37 in FIG. 3.

Figure 9:
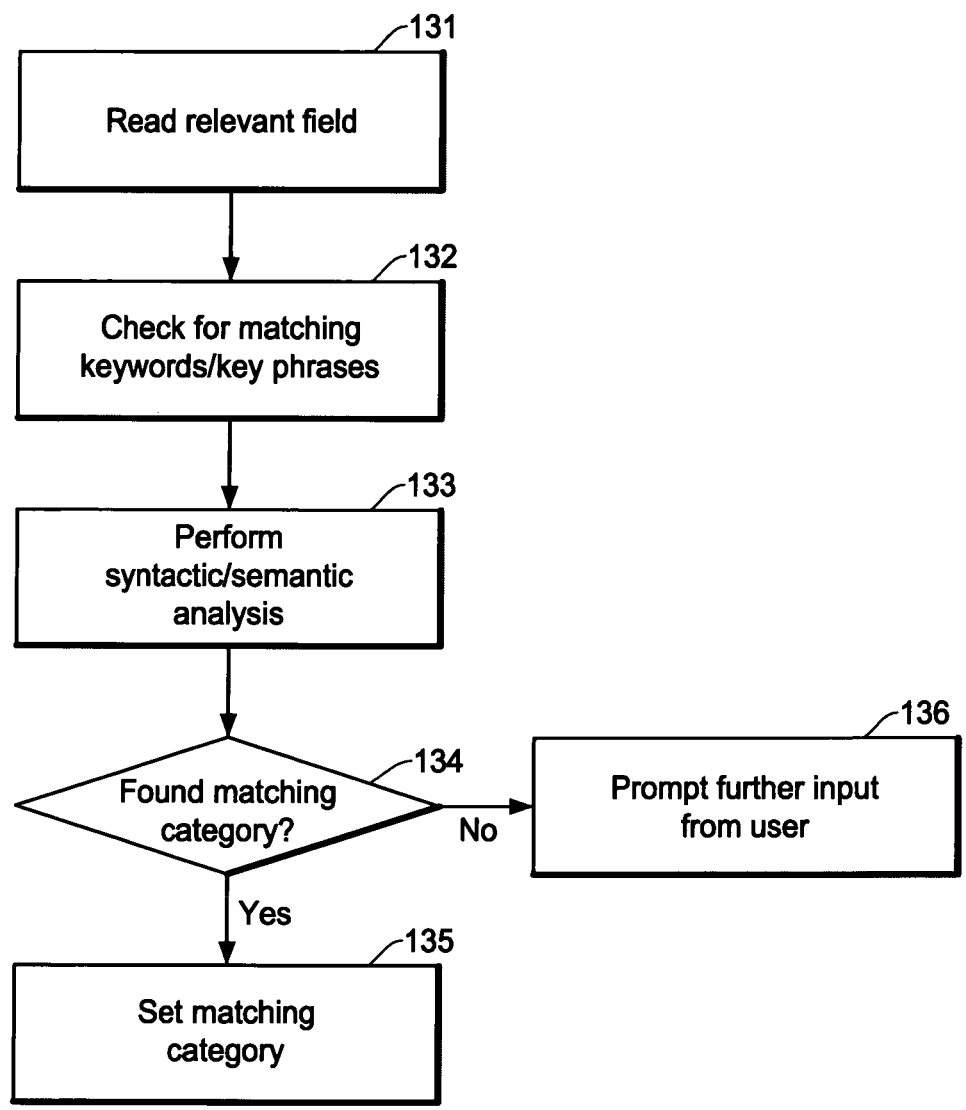
FIG. 9 is a flow chart showing the operational steps for determining the category of the subject event and extracting other relevant information for the event in accordance with the present invention.

The procedure of determining a category of an event and extracting other relevant information is described in more detail with reference to the flow chart of FIG. 9. In other words, the process of FIG. 9 is a sub-process of the steps 103 and 104 of FIG. 7A. In the first step 131, the central processing system reads a relevant field, for example, in the display of FIG. 4A, the memo field, as to the type of event.

Next, the central processing system checks the database of activity type 57 in FIG. 6 to determine if there is a matching word or phrase in the step 132. The central processing system optionally performs syntactic analysis or semantic analysis to increase accuracy of categorizing the event in the step 133. Based on the words that match the keyword or key phrases and the syntactic and semantic analysis, the central processing system judges the category of the event.

In the step 134, it is determined whether a matching category of the event type is found in the database of the central processing system. If it fails to find a matching category or likelihood of finding the matching category is low, the process will prompt the user to further input the activities involved in the event manually in the step 136. An input screen similar to that shown in FIG. 5 may be used for this purpose. If the matching category is found, the category of the event is retrieved in the step 135. The central processing system generates a template (FIG. 4B) indicating the items to bring or the whole input screen of FIGS. 4A and 5 for the event category as a template which will be transmitted to the participating members.

The method of assigning the "what to bring" items to a plurality of members can be made by incorporating the following factors. For example, one factor is a proximity or distance from a home address of each participant to a store or a supermarket selling an item to bring. A price balancing is preferably applied so that a total price of items that each member brings is approximately in the same range such as within 20% deviation. Another factor is the skill/strong points of a participant, thus, for example, if a member is good at baking cookies, she may be assigned to bring her home-made cookies for the event.

The present invention is not limited to the situations described above, but may be applicable to many other situations. For example, the present invention may be used to suggest the amount of sufficient medication to last throughout the event such as a sightseeing trip. The member's medical conditions, such as allergies or diabetics, may be stored in the member data and this information may be used to recommend foods to take.

In the case where a participant needs a special medical attention, for a doctor's visit during the event, a necessary medical card may be suggested to bring along. This recommendation would also prevent from accidentally bringing prohibited food or other items for the event. The navigation system may be equipped with a special sensor (sensor 252 in FIG. 11) to detect such prohibited food or items and notify the participant when it detects the prohibited food or item in the vehicle.

FIG. 10 is a schematic diagram showing an overall structure of network connecting participants devices, such as navigation systems, computer terminals, mobile devices, and a server, in accordance with the present invention. The network in this example includes navigation systems 181, computer terminals (PC) 182, a terminal device (TD) 183, and a server 185. The navigation systems 181, computer terminals 182, and terminal device 183 are connected to the server 185 by wireless communication.

Preferably, the navigation systems 181, computer terminals 182, and terminal device 183 are able to directly communicate with one another without intervening the server 185. Further, preferably, any one of the navigation systems 181, computer terminals 182, and terminal device 183 is able to act as a server 185. A template 187 such as shown in FIGS. 4A-4B and 5 may be retrieved from the server 185 or from the devices of participant.

The server 185 works as the central processing system described in the foregoing and has an algorithm that determines the category (type) of the event by interpreting the user's input and the required items for the event as described in the flow charts of FIGS. 7A-7B and 9. Other than the navigation systems 181, computer terminals 182, terminal device 183, a device such as a cellular phone may also be used in the system of FIG. 10. The information on the server can be updated so that improved recommendation for the "what to bring" list can be provided to the users in the form of template 187.

FIG. 11 shows an embodiment of the structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage device 231 such as a hard disc, CD-ROM, DVD, flash memory or other storage means for storing the map data. The navigation system includes a control unit 232 for controlling an operation for reading the information from the data storage device 231, and a position measuring device 233 for measuring the present vehicle position or user position. For example, the position measuring device 233 has a vehicle speed sensor for detecting a moving distance, a gyroscope for detecting a moving direction, a microprocessor for calculating a position, a GPS (global positioning system) receiver for analyzing GPS signals, and etc.

The block diagram of FIG. 11 further includes a map information memory 234 for storing the map information which is read from data storage device 231, a database memory 235 for storing database information such as point of interest (POI) information which is read out from the data storage device 231, an input device 237 for executing a menu selection operation, an enlarge/reduce operation, a destination input operation, etc. and an input device interface 238. Although a remote controller is a typical example the input device for selecting menus, executing selected functions and etc., the navigation system includes various other input methods to achieve the same and similar operations.

In FIG. 11, the navigation system further includes a bus 236 for interfacing the above units in the system, a processor (CPU) 239 for controlling an overall operation of the navigation system, a ROM 240 for storing various control programs such as a route search program and a map matching program necessary for navigation control, a RAM 241 for storing a processing result such as a guide route, a display controller 243 for generating map image (a map guide image and an arrow guide image) on the basis of the map information, a VRAM 244 for storing images generated by the display controller 243, a menu/list generating unit 245 for generating menu image/various list images, and a synthesizing unit 246.

The vehicle navigation system of FIG. 11 further includes a wireless communication device 249 for wireless communication, a buffer memory 248 for temporally storing data for ease of data processing, a monitor (display) 250, a data interface 251, and a sensor 252. The data interface 251 is an interface to an external (outside) device, such as a flash memory device to manually copy or store the information. The sensor 252 is to detect such prohibited food or items and notify the participant if it detects the prohibited food or item in the vehicle.

The wireless communication device 249 communicates with the communication interface 51 of the central processing system shown in FIG. 6 and receives the template. The template includes the list of "what to bring" as shown in FIGS. 4A-4B and 5. The wireless communication device 249 also receives the location data of the event, which is set as the destination in the navigation system at the time of the event for route guidance. The user can send information to the central processing system or directly to the other member's devices via the wireless communication device 249. The monitor 250 displays the screens such as shown in FIGS. 2 and 3. The ROM 240 stores programs for conducting the procedures of the present invention described in the foregoing with reference to FIGS. 7A-9. Based on the programs, the CPU 239 controls the overall operation of the present invention by acting as the central processing system described with reference to FIG. 6.

As has been described above, according to the present invention, the navigation system or other devices allow the participants of event to suggest or announce an upcoming event such as a party or a sports activity, and send information on the event such as a template indicating the items to bring by the participants, roles of the participants, etc. The present invention can be advantageously applied in combination with navigation systems for a upcoming event at a given destination since the navigation system can suggest where to purchase the items, guide the participants to the event location, etc. Moreover, the present invention allows the participants to add, remove, or trade the items to bring for the event or exchange information related to the event, etc. among the participants. Thus, the method and apparatus significantly improves efficiency and accuracy in the event information exchange among users of navigation systems or other devices.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A computer-implemented method for exchanging information on upcoming event among participants of the event, comprising the following steps of:
    receiving information input via an input device by a user indicating an upcoming event, an event location, date, time and participants thereof and displaying the received information on a monitor screen;
    selecting, via the input device, a group of people to which the event applies from a plurality of groups different from one another stored in a database;
    checking, by a central processing unit, a database storing data regarding types of event in response to the information input by the user to determine a type of the event according to a keyword or a key phrase included in the information input by the user;
    retrieving information regarding items required for the determined type of event and generating, on electric devices of the participants, a template including a list of items to bring by the participants of the event, and the upcoming event, event location, date and time;
    sending the template to the electric devices of the participants of the event, thereby exchanging the template indicating the list of items for the upcoming event among the participants; and
    automatically allocating the items to bring to the participants based on predetermined factors and notifying the results of allocation to all of the participants where the predetermined factors include a distance between a participant and a store to procure the item, a price balance among the participants, and a skill or expertise of a particular participant.

2. A computer-implemented method for exchanging information on upcoming event as defined in claim 1, further comprising a step of allowing, via the input device, the participants to trade among the participants as to who should bring what items to the event and notifying the results of trade to all of the participants.

3. A computer-implemented method for exchanging information on upcoming event as defined in claim 1, further comprising a step of providing recommendation to the participants as to where to procure the assigned items.

4. A computer-implemented method for exchanging information on upcoming event as defined in claim 1, further comprising a step of collecting information on behavioral aspects of the participants including as to who is in good combination with who, interests of each participants, habits of participants, comments and evaluation by participants, at the end of the event for future reference.

5. A computer-implemented method for exchanging information on upcoming event as defined in claim 1, wherein said step of checking the database storing data regarding types of event includes a step of requesting the user to provide additional information to determine the type of event.

6. A computer-implemented method for exchanging information on upcoming event as defined in claim 3, wherein said step of providing recommendation to the participants as to where to procure the assigned items includes a step of searching a database of points of interest (POI) and retrieving information on places where the assigned items are available as candidate locations for further evaluation.

7. A computer-implemented method for exchanging information on upcoming event as defined in claim 3, wherein said step of providing recommendation to the participants as to where to procure the assigned item includes a step of searching a database of points of interest (POI) and retrieving information on places where the assigned item is available, and a step of determining a recommended location to procure the item based on overall costs which include a price of the item, proximity to a home address of the participant, and proximity of a location to a guidance route that leads to the event location.

8. A computer-implemented method for exchanging information on upcoming event as defined in claim 1, wherein said template has a small card shape when displayed on a screen which mainly lists the items to bring or has a large card shape when displayed on the screen which is substantially the same as an input screen of a navigation system or a personal computer for entering the initial information on the upcoming event by the user.

9. A computer-implemented method for exchanging information on upcoming event as defined in claim 1, wherein said participants of the event communicate with one another through the wireless communication by commonly accessing a server for exchanging information or the participants of the event directly communicate with one another through the wireless communication without accessing the server.

10. An apparatus for exchanging information on upcoming event among participants of the event, comprising:
    means for receiving information input by a user indicating an upcoming event, an event location, date, time and participants thereof;
    means for selecting a group of people to which the event applies from a plurality of groups different from one another stored in a database;

means for checking a database storing data regarding types of event in response to the information input by the user to determine a type of the event according to a keyword or a key phrase included in the information input by the user and the selected group of people;

means for retrieving information regarding items required for the determined type of event and generating a template including a list of items to bring by the participants of the event, and the upcoming event, event location, date and time;

means for sending the template to the participants of the event, thereby exchanging the template indicating the list of items for the upcoming event among the participants; and means for automatically allocating the items to bring to the participants based on predetermined factors and notifying the results of allocation to all of the participants where the predetermined factors include a distance between a participant and a store to procure the item, a price balance among the participants, and a skill or expertise of a particular participant.

11. An apparatus for exchanging information on upcoming event as defined in claim 1, further comprising a step of allowing the participants to trade among the participants as to who should bring what items to the event and notifying the results of trade to all of the participants.

12. An apparatus for exchanging information on upcoming event as defined in claim 10, further comprising means for providing recommendation to the participants as to where to procure the assigned items.

13. An apparatus for exchanging information on upcoming event as defined in claim 10, further comprising means for collecting information on behavioral aspects of the participants including as to who is in good combination with who, interests of each participants, habits of participants, comments and evaluation by participants, at the end of the event for future reference.

14. An apparatus for exchanging information on upcoming event as defined in claim 10, wherein said means for checking the database storing data regarding types of event includes means for requesting the user to provide additional information to determine the type of event.

15. An apparatus for exchanging information on upcoming event as defined in claim 12, wherein said means for providing recommendation to the participants as to where to procure the assigned items includes means for searching a database of points of interest (POI) and retrieving information on places where the assigned items are available as candidate locations for further evaluation.

16. An apparatus for exchanging information on upcoming event as defined in claim 12, wherein said means for providing recommendation to the participants as to where to procure the assigned item includes means for searching a database of points of interest (POI) and retrieving information on places where the assigned item is available, and means for determining a recommended location to procure the item based on overall costs which include a price of the item, proximity to a home address of the participant, and proximity of a location to a guidance route that leads to the event location.

17. An apparatus for exchanging information on upcoming event as defined in claim 10, wherein said template has a small card shape when displayed on a screen which mainly lists the items to bring or has a large card shape when displayed on the screen which is substantially the same as an input screen of a navigation system or a personal computer for entering the initial information on the upcoming event by the user.

18. An apparatus for exchanging information on upcoming event as defined in claim 10, wherein said participants of the event communicate with one another through the wireless communication by commonly accessing a server for exchanging information or the participants of the event directly communicate with one another through the wireless communication without accessing the server.

* * * * *